United States Patent [19]
Gould

[11] 3,847,122
[45] Nov. 12, 1974

[54] LIVESTOCK INSECTICIDE DISPENSING BAG

[75] Inventor: Maurice O. Gould, Minden, Nebr.

[73] Assignee: Agricultural Enterprise, Inc., Fremont, Nebr.

[22] Filed: May 14, 1973

[21] Appl. No.: 359,786

[52] U.S. Cl. ............................................. 119/159
[51] Int. Cl. ........................................... A01k 29/00
[58] Field of Search ........... 119/159, 157, 156, 160; 222/189; 43/132

[56] References Cited
UNITED STATES PATENTS

| | | | |
|---|---|---|---|
| 2,991,756 | 7/1961 | Thaete | 119/159 |
| 3,033,166 | 5/1962 | Murray et al. | 119/157 |
| 3,364,900 | 1/1968 | Knapp | 119/159 |
| 3,563,209 | 2/1971 | Mommer | 119/159 |
| 3,677,233 | 7/1972 | White, Jr. | 119/157 |

Primary Examiner—Warner H. Camp
Attorney, Agent, or Firm—Henderson & Strom

[57] ABSTRACT

A refillable livestock insecticide self dispensing bag to be suspended from a supporting device and adapted to hold an insecticide which is dispensed when an animal rubs against or butts the bag; wherein the bag has at least two plys formed from plastic of the like which are disposed in juxtaposition, with the inner ply being formed of a loosely woven material and the outer ply being formed of a tightly woven or spun material, and including further a plurality of rocks disposed therein to maintain the insecticide in a powder form, to prevent the animal from chewing on the bag and to prevent the bag from whipping in the wind. The two ply bag is provided to allow the insecticide to filter slowly therethrough and is further substantially water resistant to prevent moisture from contacting the insecticide and thus causing it to cake.

4 Claims, 4 Drawing Figures

PATENTED NOV 12 1974　　　　　　　　　　　　　　3,847,122

LIVESTOCK INSECTICIDE DISPENSING BAG

BACKGROUND OF THE INVENTION

Lice, flies and other insects substantially reduce the weight gain and can cause an anemic condition thereby lowering the resistance to diseases of an animal produced for the market and affect the quality and quantity of milk of an animal in a dairy herd. Therefore proper application at frequent intervals of insecticides is a necessity to increase the profits and to lower the costs of raising and maintaining an animal.

A number of insecticide dust bags are presently on the market and have been in use for several years. These bags are generally made of burlap or other moisture absorbent material which in inclement weather absorb moisture and cause the insecticide contained therein to cake or seal the pores of the bag. Thus, when an animal rubs against the bag no insecticide is dispensed and the purpose of the bag is negated. In addition, insecticide is normally combined with a carrier and moisture can cause it to separate therefrom. Furthermore the bags are frequently chewed on by the animal and ultimately become worthless for the purpose for which they were manufactured.

Several commercially available bags are enclosed in a plastic liner and upon being suspended from a support device the bottom portion of the liner is removed thus exposing the inner burlap bag to the atmosphere. A wet animal or a damp or rainy day causes moisture to be absorbed and caking occurs.

Other bags have a plastic inner or outer liner which extends from the top of the bag to about the midpoint of the bag and is open therebelow. These liners are provided to shed rain and the like, however they provide a seal for humidity or moisture which during the heat of the day evaporates and collects and builds up near the top of the bag under the liner. As the temperature drops in the night the moisture laden air cools and the condensation thereof collects on the insecticide.

It has also been found that burlap, absorbant materials and loosely woven materials are easily damaged by the horns of an animal.

Any absorbent material which is constantly subjected to moisture and heat will deteriorate and ultimately rupture, thus requiring costly replacement or abandonment of this method of applying insecticide.

SUMMARY OF THE INVENTION

This invention relates generally to an improvement in insecticide dust bags and in particular to a novel suspendable substantially water resistance non-burlap or non-absorbent bag having a plurality of rocks disposed in the bag with an insecticide to prevent caking or to maintain the insecticide in a powder form. The bag includes at least two plys of material disposed in juxtaposition and sewn along the edges to form an open top bag. The bag is then turned inside out with the sewn edges disposed on the inside. Three spaced pairs of grommets are secured to both sides of the bag at the top thus permitting the upper edge to be folded over and substantially sealed, and also to strengthen the suspension portion of the bag. The inner ply of the bag is formed from a loosely woven plastic material and the outer ply is formed from a more tightly woven or spun plastic material, wherein the insecticide is contained in the inner ply and will escape through the two plys.

The bag is then loaded with a plurality of small rocks and an insecticide. The rocks prevent the bag from whipping in the wind and the movement of the rocks maintain the insecticide in a usable form. In addition the rocks weight the bag which encourages the animals to rub thereagainst and the rolling action of the stones in the bag tends to cause the hair of the animal to stand erect thus providing better penetration of the insecticide through the area between the hairs to the hide. The rocks also act as a deterrent against chewing of the bag by the animals since by nature animals will not chew on hard objects.

It is an object of this invention to provide a novel refillable livestock insecticide self dispensing bag formed from a two ply material which is substantially water resistant.

Another object of the insecticide applicator bag of this invention is the provision of a bag having a tightly woven or spun outer surface and a looser woven inner surface which will substantially prevent the passage of moisture thereinto, which resists rotting, which is substantially horn proof, which maintains an insecticide contained therein in a powder form, which permits the powdered insecticide to filter through the surfaces at the proper time, and which is readily suspendable from a support structure.

Yet another object of this invention is to provide an insecticide dust bag wherein a plurality of rocks are disposed therein to prevent the bag from whipping in the wind, to encourage animals to rub thereagainst, to provide better penetration of the dust between the hairs of the animals thus allowing the dust to reach the hide, to maintain the insecticide in a usable condition within the bag, and to prevent the animals from chewing on the bag.

A further object of this invention is the provision of a livestock insecticide applicator bag which is extremely effective in use, economical of manufacture, and simple and rugged in construction.

These objects and other features and advantages of this invention will become readily apparent upon reference to the following description, when taken in conjunction with the accompanying drawings.

DESCRIPTION OF THE PREFERRED EMBODIMENT

Figure 1:
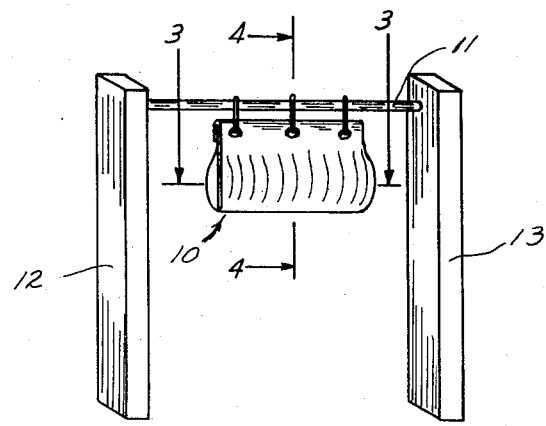
FIG. 1 is a perspective view of the livestock insecticide dispensing bag of this invention as it is found when suspended from a supporting structure.

Referring now to the drawings, the livestock insecticide dispensing bag of this invention is indicated generally at 10 in FIG. 1. The bag 10 is shown secured to and freely suspended from a horizontally disposed pole 11 which is secured between two vertically disposed uprights 12 and 13. Free suspension permits the bag to swing back and forth as the animal rubs thereagainst.

The bag 10 (FIGS. 1 – 4) consists of two plys, an inner ply 14 and an outer ply 16 disposed in juxtaposition, and sewn together by stitching 17 along their edges. The inner ply 14 is formed from a loosely woven material, preferrably of plastic, which will permit the contents, such as an insecticide 18, to sift or filter between the fibers. Juxtaposed against the inner ply 14 is the outer ply 16 which is formed from a closer woven or spun polypropylene or the like which also permits the insecticide to sift between the fibers. The material of each bag may also be treated with an ultra violet ray inhibitor to prevent deterioration thereof upon extended exposure to the sun.

Figure 3:
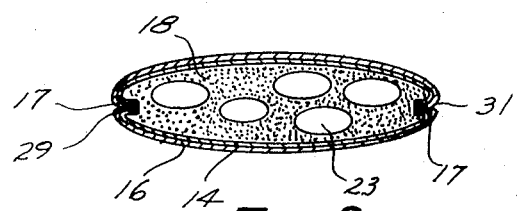
FIG. 3 is a sectional view taken along the lines 3 — 3 in FIG. 1.
Figure 4:
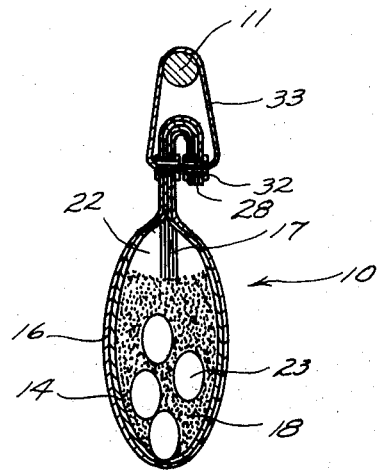
FIG. 4 is a sectional view taken along the lines 4 — 4 in FIG. 1.

Formation of the bag 10 is accomplished by taking a rectangular sheet of the inner ply 14 and placing it over the outer ply 16. The two plys 14 and 16 are then folded over at their midpoint wherein approximately one-half of the outside surface 19 of the outer ply 16 is in contact with the other one-half of the outer ply and the inner ply inside surface 21 is disposed facing outwardly of the folded bag. The edges of the two plys 14 and 16 are then sealed or sewn together by stitching 17 to form an open top bag 10. The bag 10 is then turned inside-out thus placing the inside surface 21 in the bag and the outside surface 19 facing outwardly, with the edges of the two plys 14 and 16 disposed on the inside of the bag 10 (FIGS. 3 and 4). It will be noted that no seam is provided at the bottom of the bag thus providing easier dispensing and longer wear. The area between the inside surfaces 21 forms a chamber 22 in which rocks 23 and the powdered insecticide 18 are deposited.

Figure 2:
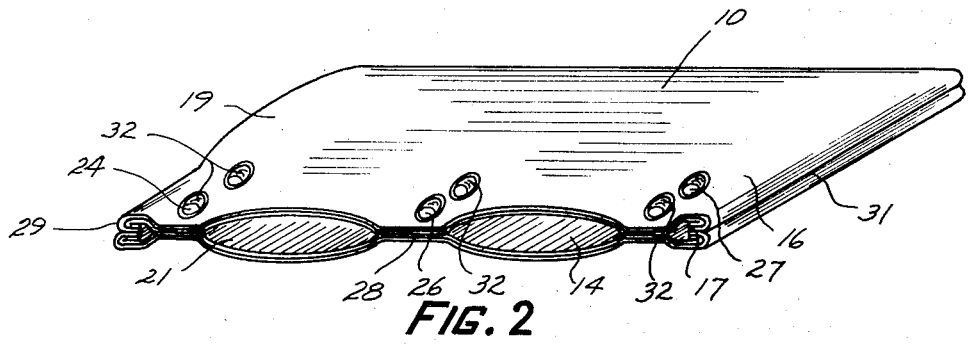
FIG. 2 is a perspective view of the bag before attachment to the supporting structure.

Three spaced pairs of holes 24, 26 and 27 (FIG. 2) are then punched through the bag proximate its open end 28, wherein one pair 24 is disposed adjacent one side edge 29, the second pair 26 is disposed at approximately the midpoint of the open end 28 and the third pair 27 is disposed adjacent the other side edge 31. Each pair of holes is longitudinally spaced apart, as best shown in FIG. 2. A rivet or grommet 32 is then disposed in each hole and secured to the bag 10 in a conventional manner.

In operation the insecticide 18 is deposited with the rocks 23 in the chamber 22. The open end 28 is folded over (FIG. 4) with the grommets 32 of each pair of holes in axial alignment. A securing means 33 (FIG. 4) such as a rope or wire is then threaded through each pair of grommets 32 and tied. A loose end of each securing means 33 is then secured to the pole (FIG. 1) thus suspending the bag and permitting it to swing freely. The action of an animal rubbing or butting against the bag 10 will cause the insecticide 18 to sift between the fibers of the two ply bag 14 and 16 and onto the animal. In the event of rain or if the animal is wet substantially no moisture will infiltrate the fibers to the chamber 22. However, if moisture does infiltrate the bag and cause the powdered insecticide to cake, then the movement of the rocks as the bag moves will cause any caked insecticide to powder.

Insecticide 18 is also available in cartridges (not shown) which, after being punched or opened, can be placed in the chamber 22, movement of the bag causes the insecticide to escape therefrom into the chamber and then through the two ply bag 14 and 16, however the rocks 23 are still required to condition the insecticide which has escaped the cartridge.

It will thus be observed that a novel livestock insecticide dispensing bag has been disclosed which is substantially moisture resistant, rot resistant, horn resistant because the closely woven outer ply resists puncturing, and which retains the insecticide in a powder form. It has also been found that as the weighted bag rubs across the animals back it tends to cause the hair of the animal to rise, thus permitting the dust to filter between the hairs to the hide. The rocks 23 also help to prevent the animal from chewing on the bag, thus substantially increasing its life.

I claim:

1. A livestock insecticide dispensing bag comprising:

a loosely woven plastic inner ply for holding an insecticide in a powdered form;

a plastic outer ply enclosing said inner ply, said plies having common seam lines and forming an open topped bag;

said inner ply and outer ply being permeable to permit the insecticide to sift therethrough when an animal rubs or butts against said outer ply; and a plurality of rocks disposed in said inner ply in contact with the insecticide to prevent the caking of same.

2. A livestock insecticide dispensing bag as defined in claim 1 and including three longitudinally spaced pairs of holes punched through said inner ply and said outer ply proximate said open top, said open top being folded over with each said holes of each said pair in alignment, and a securing means passed through said holes to secure said open top in said folded position.

3. A livestock insecticide dispensing bag as defined in claim 2 wherein a grommet is disposed in each said hole and secured to said inner ply and said outer ply.

4. A livestock insecticide dispensing bag as defined in claim 3 wherein said inner ply and said outer ply are disposed in juxtaposition and said two plys are folded over at their midpoint with said inner ply on the outside, and the edges thereof are secured together to form an open topped bag, and said bag is then turned inside-out with said inner ply disposed inside said outer ply with said secured together edges disposed inside said inner ply, thus no seam lines are exposed exteriorly of said bag.

* * * * *